United States Patent [19]

Janky et al.

[11] Patent Number: 5,918,183

[45] Date of Patent: *Jun. 29, 1999

[54] CONCEALED MOBILE COMMUNICATIONS SYSTEM

[75] Inventors: James M. Janky, Los Altos, Calif.; Gregory T. Janky, Bellingham, Wash.

[73] Assignee: Trimble Navigation Limited, Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/315,055

[22] Filed: Sep. 29, 1994

Related U.S. Application Data

[63] Continuation-in-part of application No. 07/938,813, Sep. 1, 1992, abandoned.

[51] Int. Cl.⁶ ........................................... H04Q 7/32
[52] U.S. Cl. .......................... 455/550; 455/282; 455/345; 343/111; 343/712; 343/713; 343/717; 340/825.31; 340/825.69
[58] Field of Search ........................ 379/58, 60; 455/345, 455/282, 550; 343/712, 713, 700 MS, 711, 717; 180/168, 164; 296/24.1; 340/825.69, 825.31; 342/20, 27, 80

[56] References Cited

U.S. PATENT DOCUMENTS

| | | | |
|---|---|---|---|
| 3,623,108 | 11/1971 | DuBois et al. | |
| 4,009,375 | 2/1977 | White et al. | |
| 4,248,069 | 2/1981 | Burbank | 455/345 |
| 4,370,658 | 1/1983 | Hill | 343/713 |
| 4,584,709 | 4/1986 | Kneilsel et al. | 455/78 |
| 4,751,514 | 6/1988 | Sheriff | 343/717 |
| 4,758,166 | 7/1988 | Bonnett et al. | 343/712 |
| 4,760,402 | 7/1988 | Mizuno et al. | 343/713 |
| 4,788,550 | 11/1988 | Chadima, Jr. | 343/712 |
| 4,835,541 | 5/1989 | Johnson et al. | 343/713 |
| 4,866,453 | 9/1989 | Nagy et al. | 343/712 |
| 4,873,530 | 10/1989 | Takeuchi et al. | 343/711 |
| 4,897,643 | 1/1990 | Shibata et al. | 340/825.69 |
| 4,987,422 | 1/1991 | Ryan | 343/713 |

(List continued on next page.)

FOREIGN PATENT DOCUMENTS

| | | | |
|---|---|---|---|
| A242099 | 10/1987 | European Pat. Off. | G01S 5/14 |
| A278069 | 8/1988 | European Pat. Off. | H01Q 9/04 |
| A358308 | 3/1990 | European Pat. Off. | H01Q 1/32 |
| 9113534 | 2/1992 | Germany | B60R 25/10 |
| 3140302 | 5/1991 | Japan . | |

OTHER PUBLICATIONS

Sluru,"On–Board Navigation System for Your Car" Popular Electronics, Jan. 1993.

Peters, "Ford Debuts Factory–Installed Cellular Phone", The Washington Times, Jul. 22, 1994.

PR Newswire, "Global Positioning Satellite (GPS) and technology and the Cellular Phone Network," Apr. 18, 1995.

Primary Examiner—William Cumming
Attorney, Agent, or Firm—Donald S. Dowden; Cooper & Dunham LLP

[57] ABSTRACT

A mobile communications system for transmitting or receiving a broadcast signal and designed for mounting on in a vehicle has a transmitter or receiver and one or more antennas electrically connected to the transmitter/receiver. The system is mounted on or in a vehicle so that the transmitter/receiver and the antenna(s) are concealed. The system includes a GPS unit for receiving and processing a GPS and signal a cellular telephone unit for transmitting a fix of the vehicle location (to the police, for example). The system is particularly useful in recovering stolen vehicles and deterring theft.

2 Claims, 18 Drawing Sheets

U.S. PATENT DOCUMENTS

| | | | |
|---|---|---|---|
| 5,005,020 | 4/1991 | Ogawa et al. | 343/713 |
| 5,111,207 | 5/1992 | Allen | 342/20 |
| 5,134,392 | 7/1992 | Takeuchi et al. | 340/825.31 |
| 5,144,318 | 9/1992 | Kiahi | 342/357 |
| 5,177,494 | 1/1993 | Dorrie et al. | 343/711 |
| 5,202,913 | 4/1993 | Lang et al. | 379/58 |
| 5,218,367 | 6/1993 | Sheffer et al. | 342/457 |
| 5,235,633 | 8/1993 | Dennison et al. | 379/60 |
| 5,315,303 | 5/1994 | Tsou et al. | 342/27 |
| 5,341,434 | 8/1994 | Kawamoto | 455/345 |
| 5,355,142 | 10/1994 | Marshall et al. | 343/700 MS |
| 5,402,134 | 3/1995 | Miller et al. | 343/742 |
| 5,428,830 | 6/1995 | Zerod et al. | 455/282 |
| 5,448,456 | 9/1995 | Huynh | 362/80 |
| 5,490,704 | 2/1996 | Calnan | 296/24.1 |
| 5,504,478 | 4/1996 | Knapp | 340/825.69 |
| 5,532,709 | 7/1996 | Talty | 343/819 |
| 5,610,620 | 3/1997 | Stites et al. | 343/725 |
| 5,649,316 | 7/1997 | Prudhomme et al. | 455/345 |
| 5,649,317 | 7/1997 | Suzuki | 455/345 |

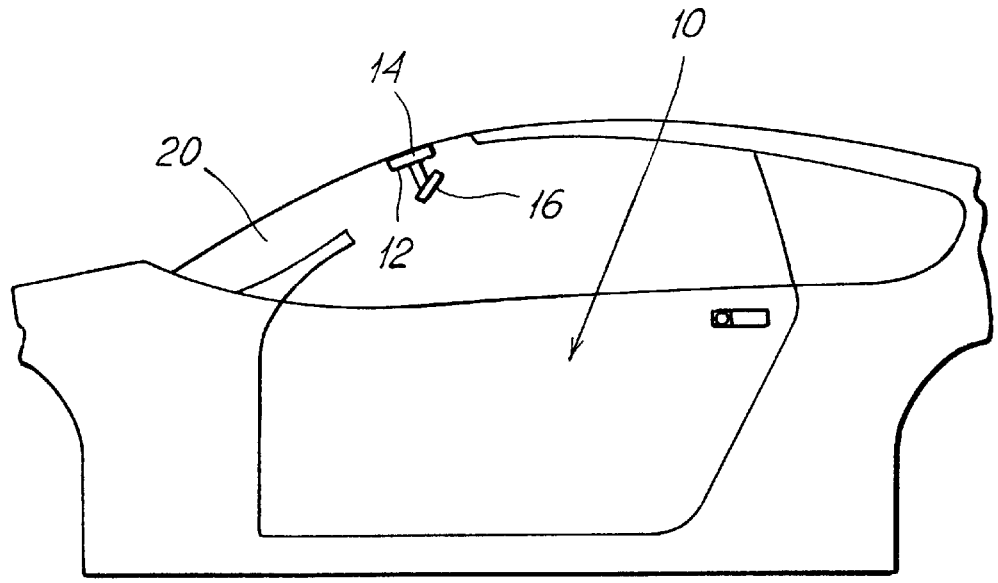
F I G. 1
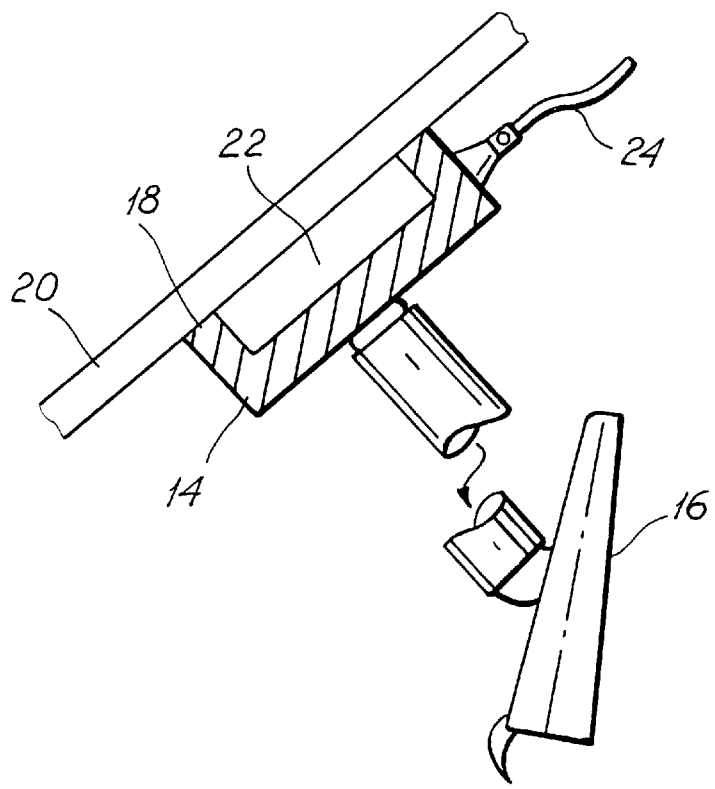
F I G. 2

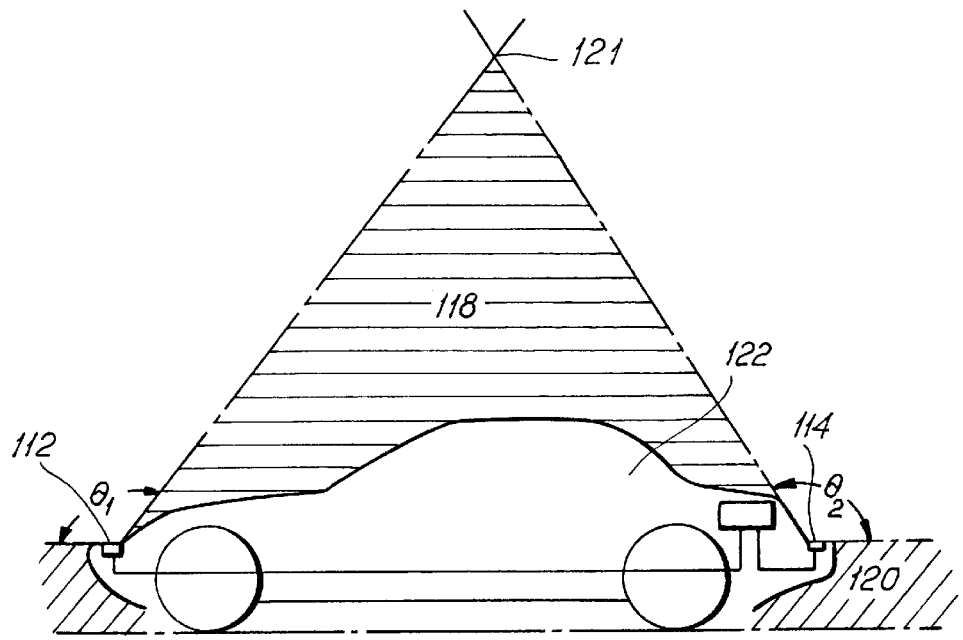
F I G. 20
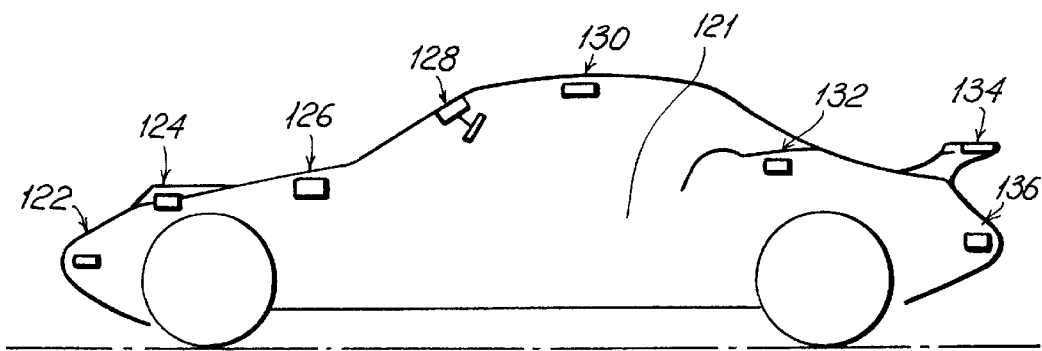
F I G. 21
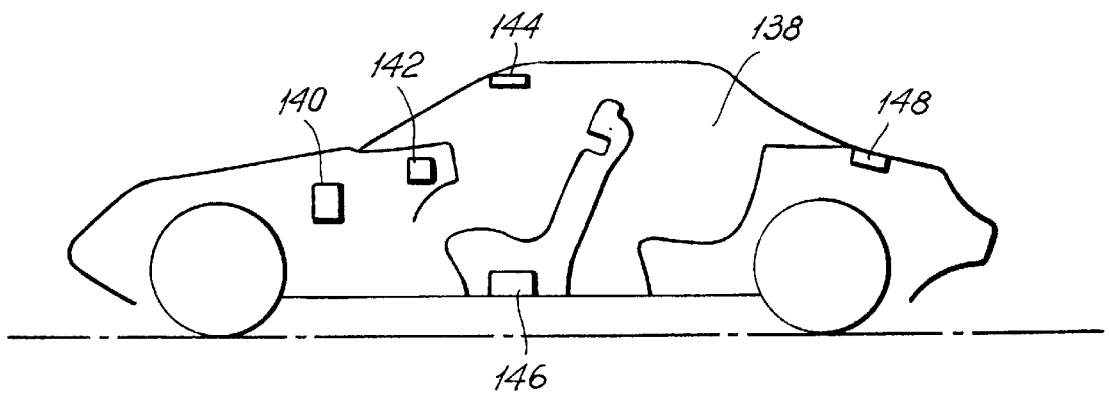
F I G. 22

CONCEALED MOBILE COMMUNICATIONS SYSTEM

CROSS-REFERENCE TO RELATED APPLICATION

This is a continuation-in-part of application Ser. No. 07/938,813 filed Sep. 1, 1992, by Robert P. Denaro, Allan M. Disman, James M. Janky, and Donald J. Dashefsky.

BACKGROUND OF THE INVENTION

1. Field of the Invention

This invention relates to communications systems and, more particularly, to a novel and highly effective mobile communications system and method.

2. Description of the Prior Art

Mobile communications systems designed for transmitting or receiving a broadcast signal and for mounting on or in a vehicle are well known. Examples include AM, FM and CB radio, TV, cellular telephones, and satellite navigation (GPS) units. Such a system includes a transmitter or receiver, often both a transmitter and a receiver, sometimes combined in a single unit called a transceiver, plus one or more antennas electrically connected to the transmitter/receiver. Means is provided for mounting the system on or in a vehicle.

However, in the prior art, inadequate measures have heretofore been taken to mount the system so that the transmitter/receiver and antenna(s) are concealed. An antenna must be mounted, it is conventionally thought, in a visible, exposed position in order to transmit or receive a broadcast signal. The AM/FM radio antenna of a sedan, coupe or limousine, for example, is typically mounted in some older models just above the center of the top of the windshield and in most newer models on the left or right side of the car (usually the right side), either in front of the front door or on the rear quarter panel. An antenna for telephone communications or TV is sometimes mounted on the rear of a car between the rear window and the trunk lid and centered between the left and right sides of the car. Some antennas are retractable when not in service, but, if so, they are always extended when in service, and even when retracted their location is easily spotted. Similarly, the transmitter or receiver is conventionally mounted in an obvious and visible position on, in or under the dashboard of the vehicle so that its controls are readily accessible to the driver of the vehicle.

In some applications, the exposure and visibility of the system presents serious problems. It has been proposed, for example, that a mobile communications system including GPS and cellular telephone units could automatically broadcast the position of a stolen vehicle to facilitate recovery of the vehicle by the police. If, however, a person stealing the vehicle sees that it is equipped with a GPS antenna, he need only disable the GPS unit in order to prevent the acquisition of new fixes of the vehicle location. If he disables the cellular telephone unit, he can also prevent the transmission of any previously determined locations to a remote receiving station.

Since an antenna by the nature of its operation needs to be in some sense exposed and a transmitter/receiver (or at least the controls) must be handy to the vehicle driver, it has been considered more-or-less useless to try to conceal them. This is particularly the case since even if concealment were possible, any predetermined location of a concealed antenna or transmitter/receiver on a run of mass-produced vehicles would quickly become known to professional thieves, who upon stealing a vehicle or in preparation for doing so would without any difficulty find and disable the communications system.

OBJECTS AND SUMMARY OF THE INVENTION

An object of the invention is to remedy the problems of the prior art outlined above. In particular, an object of the invention is to provide a mobile communications system that is less subject to easy disablement than a conventional system. Another object of the invention is to provide a mobile communications system that includes a GPS system and cellular telephone to enable tracking of stolen vehicles.

In accordance with one aspect of the invention, a mobile communications system is provided for receiving a broadcast signal and is designed for mounting on or in a vehicle. The system comprises a receiver and an antenna electrically connected to the receiver. Means is provided mounting the system on or in a vehicle so that both the receiver and the antenna are concealed. The signal as received by the system ideally has a relationship to the location of the vehicle, and the system includes a GPS unit for processing the signal.

In accordance with an independent aspect of the invention, a method is provided of concealing a mobile communications system on or in each of a large number of similar vehicles comprising the steps of mounting a transmitter or receiver and an antenna electrically connected to the transmitter or receiver on or in the vehicles at locations relative to the vehicles that differ from one to another of the vehicles.

Preferably, the communications system includes a cellular telephone so that fixes of the vehicle location can be transmitted to a remote station (for example a police station).

BRIEF DESCRIPTION OF THE DRAWING

A better understanding of the objects, features and advantages of the invention can be gained from a consideration of the following detailed description of the preferred embodiments thereof, in conjunction with the appended figures of the drawing, wherein:

FIG. 1 is a fragmentary view in side elevation of a vehicle incorporating a first embodiment of apparatus constructed in accordance with the invention including a concealed patch antenna for GPS use;

FIG. 2 is an enlarged detail view, partly in section, of the concealed antenna shown in FIG. 1;

FIG. 5b is an enlarged detail view in side elevation of the concealed antenna shown in FIG. 5a;

FIG. 20 is a diagram showing the employment of two patch antennas to avoid problems of signal reception because of shadows cast by a vehicle;

FIG. 21 is a diagram showing examples of possible antenna locations on a passenger vehicle in accordance with the invention;

FIG. 22 is a diagram showing possible transmitter/receiver locations on a passenger vehicle in accordance with the invention;

DESCRIPTION OF THE PREFERRED EMBODIMENTS

Figure 3:
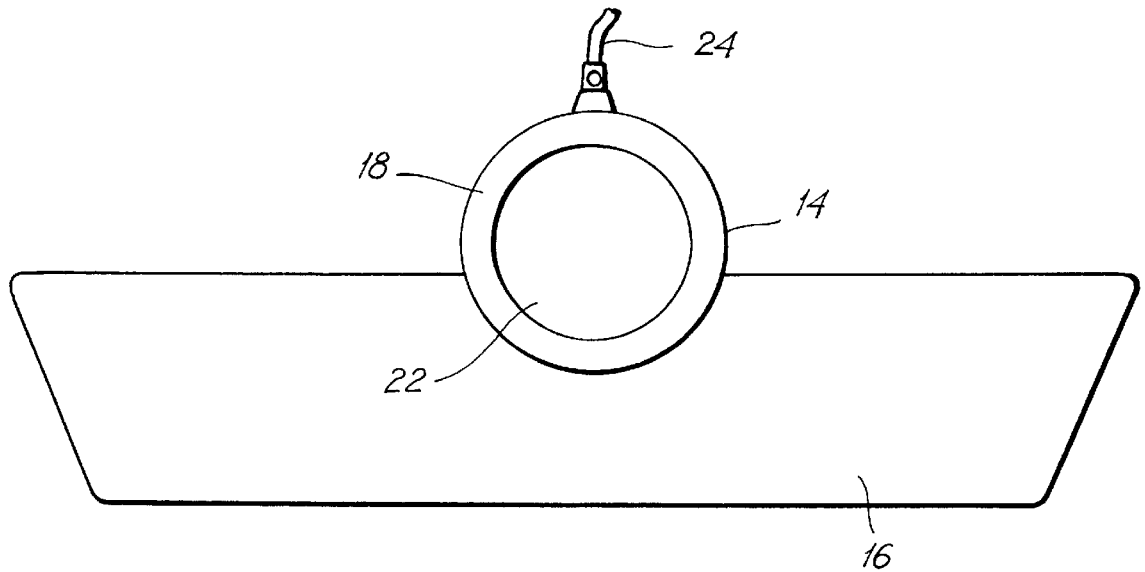
FIG. 3 is a front view (i.e., view from the front of the vehicle looking towards the rear) of the apparatus of FIG. 2.
Figure 4:
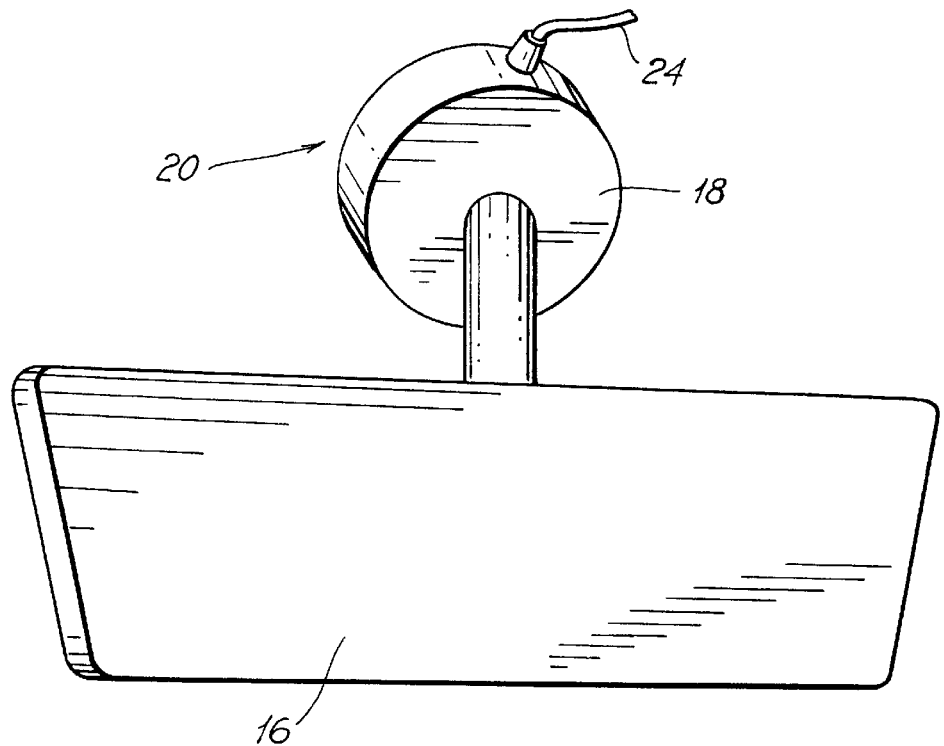
FIG. 4 is a perspective view from the driver's seat showing the apparatus of FIGS. 2 and 3.

The following description is mainly in terms of a patch antenna used to receive signals from satellites by which ground position can be fixed. This technology is well developed and well known to those skilled in the art and need not be disclosed herein. A patch antenna because of its small size and convenient shape is easily concealed, as explained in detail below. If a thief is unaware of the existence of a patch antenna or another antenna for receiving signals from satellites by which a fix may be calculated, he will perhaps see no need to disable the cellular telephone of the vehicle, assuming he spots it. The primary need therefore is to conceal the GPS unit, including both the antenna and the receiver.

The principles of the invention apply also, however, to the concealment of a cellular telephone unit, including both the transmitter/receiver and the antenna. The customary shape of the antenna makes its concealment more difficult than is the concealment of a patch antenna, but concealment is possible in accordance with the principles of the invention as described below.

The term "concealed" as used herein is a generic term including at least the terms "hidden," "camouflaged," and "disguised." The latter terms have overlapping meanings but may be distinguished in some cases as follows: The term "hidden" sometimes means literally out of sight; if one looks in the direction of the thing hidden, one does not see it because it is essentially totally covered by intervening structure. The term "camouflaged" sometimes refers to a structure that is not hidden (i.e., if one looks at it, one can see the structure in question) but which is treated so as to attract no attention to itself. It is there, one can recognize it if one knows where to look and how to interpret what one sees, but because of the camouflage one tends not to notice it. The term "disguised" sometimes refers to a structure that may attract attention, indeed that one may stare at, but which is treated so that it resembles something other than what it really is and is ordinarily not recognized for what it is.

In the following description, a n antenna that is accommodated in a well or trough, covered with MYLAR (a DuPont trademark for a brand of fluorocarbon polymer), and painted over so that it is indistinguishable from, say, the roof of a car in which it is mounted may be regarded as hidden. An antenna that is incorporated in a rear-view mirror assembly and might be recognized if one knew where to look may be regarded as camouflaged in the sense that it does not attract attention to itself. An antenna that is incorporated in a hood ornament or corporate emblem or logo may attract attention to itself in the sense that the purpose of the ornament or logo is to be looked at but may be regarded as disguised in that it resembles a part of the vehicle extraneous to the communications system. In all of the examples set out above, the antenna is "concealed" in the generic sense in which the term is defined above.

As noted above, there are no hard-and-fast lines between the separate categories "hidden," "camouflaged" and "disguised." The concepts merge into one another.

One objective of concealing the GPS antenna is to reduce the ability of a thief to disable the position location unit which the antenna supports as part of a GPS receiver. Such a unit is likely to be useful in tracking stolen vehicles, when the unit forms a part of a general communications system that also includes, for example, a cellular telephone. The antenna and transceiver for the cellular telephone are therefore also preferably concealed so that they are not readily disabled.

There are two classes of installation: 1) On an OEM basis at the time of manufacture of the vehicle; and 2) as a retrofit to an existing vehicle, sold through an aftermarket.

An OEM installation includes at least the following mounting possibilities:

1. In the roof of the vehicle, whereby part of the normal roof metal is cut away and a GPS patch antenna is installed in the roof, flush with the roof; the antenna top has a flat surface that conforms to that portion of the roof that has been cut away. The entire antenna assembly is fitted with a covering that minimizes or hides the seam between the antenna edge and the roof material. The size of the patch antenna assembly is only about 1.5×1.5 inches (3 or 4 centimeters square), and so does not weaken the roof structure and is easy to conceal. The concealment can be effected using means including the same paint or enamel as that normally applied to the exterior of the vehicle. The paint, enamel or other covering (e.g., MYLAR) should of course be relatively transparent to the electromagnetic radiation in the transmitted frequency.

2. In the trunk lid of the vehicle (assuming it is a passenger car with a trunk); the same method is employed as in the case of the roof.

3. As a new-style hood ornament, located as part of the hood of the vehicle.

4. In the hood proper, mounted as in the roof or the trunk lid.

5. In the front or rear bumper of the car, on cars where this is feasible. The possibility exists because there is often a large rubber section that is part of the "5 mph" bumper system, which collapses when the bumper strikes something.

6. As the top part of a third tail light assembly, normally located on either the trunk lid or inside the vehicle on the rear deck behind the back seat, at the bottom of the rear window.

7. In t he rear deck itself, in the same way as it might be in the roof or trunk lid.

8. As part of the mounting assembly of an inside or outside rear-view mirror used by the driver to see behind him. This is preferably a stylized assembly.

In the retrofit environment, the opportunities are more limited, but a rear-deck mount is quite feasible, as is a replacement rear-view mirror mounting assembly. Adding the wiring is no more complicated than installing a hands-free cellular phone.

FIGS. 1–4 show a vehicle 10 incorporating a rear-view mirror assembly 12 including a mount 14 and a mirror 16. The mount 14 has a substantially flat surface 18 (FIG. 2) adapted to be cemented to the windshield 20 (FIGS. 1 and 2) of the vehicle 10. Exposed on the surface 18 adjacent to the windshield 20 is a GPS patch antenna 22 connected by a cable 24 to a GPS unit (not shown in FIGS. 1–4). The patch antenna 22 is electrically insulated from the surrounding structure (except of course the cable 24) so that it effectively receives radiated electromagnetic energy, as those skilled in the art will readily understand.

Figure 5A:
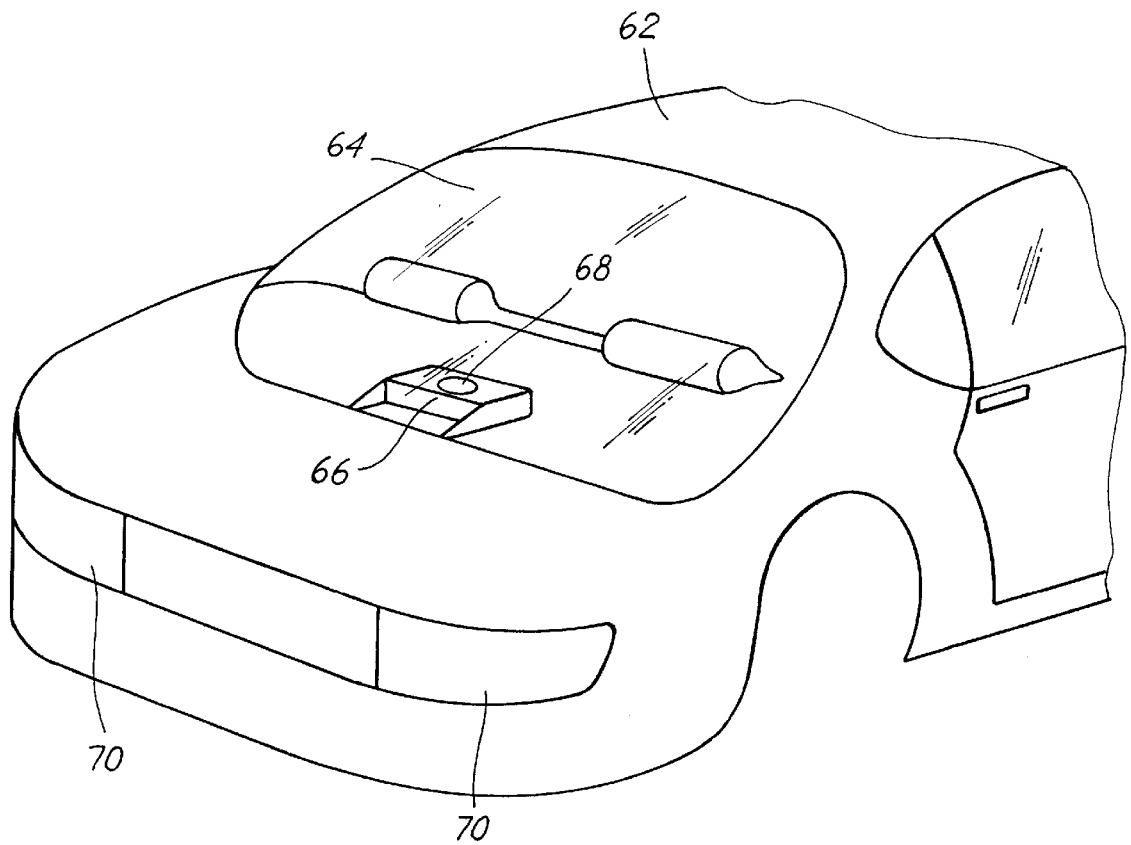
FIG. 5a is a perspective view from the right rear of a vehicle showing another embodiment of apparatus constructed in accordance with the invention including a concealed patch antenna for GPS use.
Figure 5B:
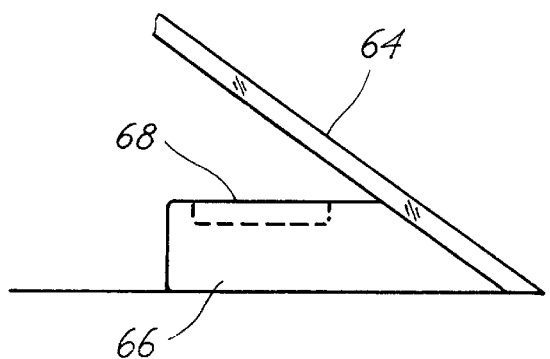

FIGS. 5a and 5b show a vehicle 62 having within the passenger cabin and abutting the rear window 64 a third tail light 66 in which an antenna 68 is concealed. A third tail light is required on new cars sold in the United States. The third tail light is positioned either inside or outside the passenger cabin and higher than the first and second tail lights 70. Of course, it is within the scope of the invention to mount the antenna on any of the three tail lights (or on a fourth or other tail light should the vehicle have one or more other tail lights).

Figure 6A:
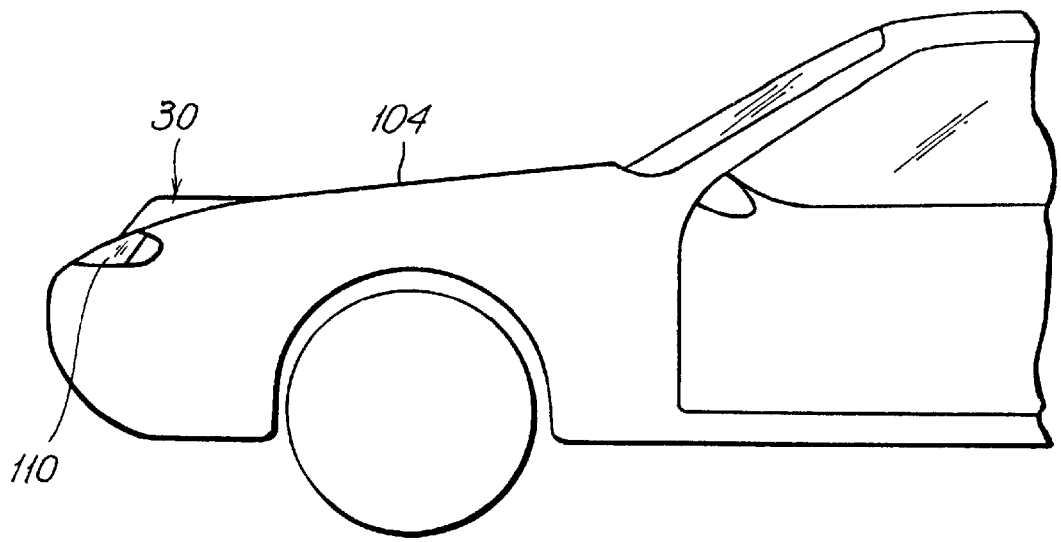
FIG. 6a is a fragmentary elevational view of a vehicle having a patch antenna incorporated in a hood ornament.
Figure 6B:
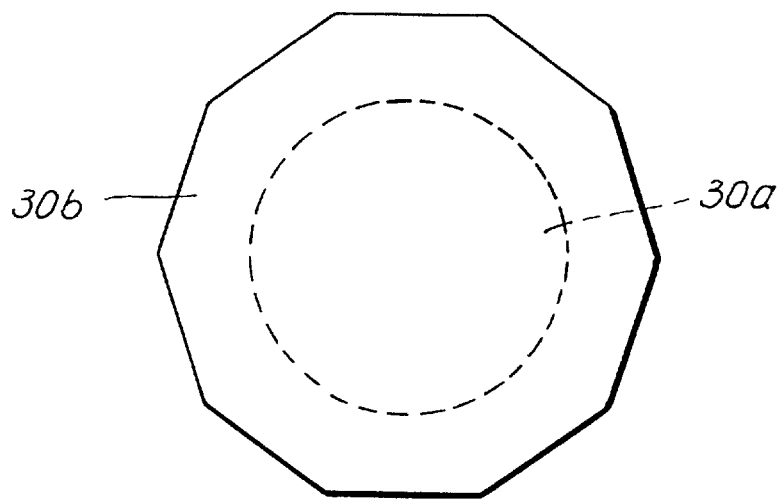
FIG. 6b is a plan view of a representative design, emblem or logo that can incorporate a concealed patch antenna.
Figure 6C:
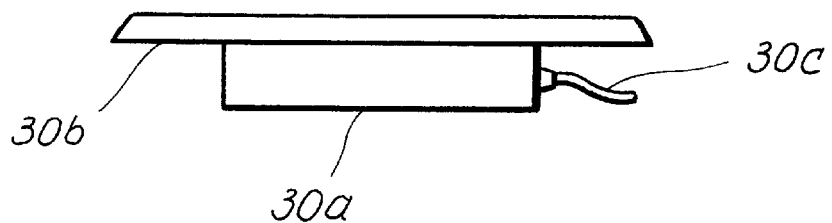
FIG. 6c is a view in side elevation of the structure of FIG. 6b.

FIG. 6a shows an ornament 30 positioned centrally in a left-to-right direction at the front end of a hood 104 above the headlights 110. FIGS. 6b and 6c show a patch antenna 30a adapted to be supported by a mount 30b and sunk into the ornament. The cable 30c runs under the hood 104 (FIG. 6a) to the GPS processor.

Figure 7:
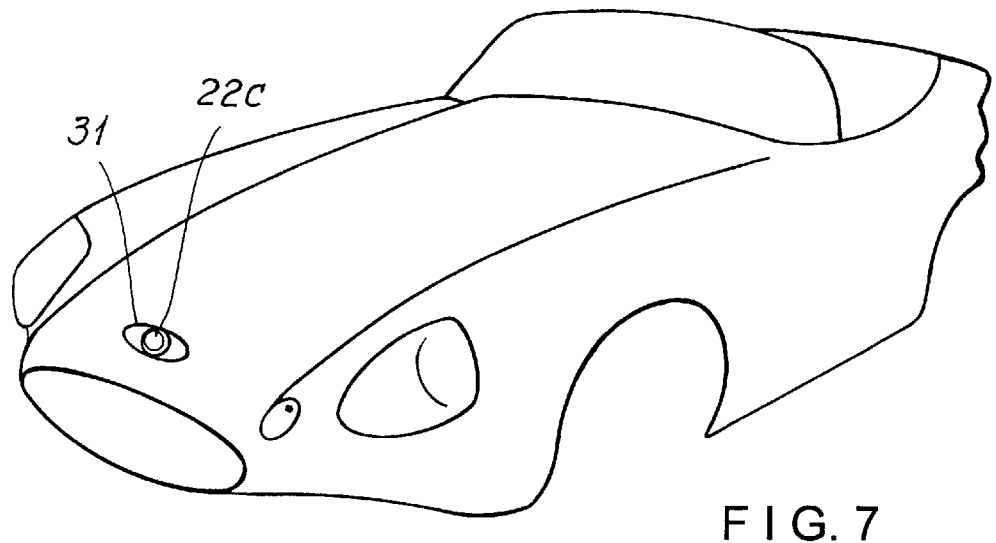
FIG. 7 is a fragmentary perspective view of a vehicle having a patch antenna incorporated in an emblem or logo.

FIG. 7 shows a car with an emblem or logo 31 in which a GPS antenna 22c is concealed.

A company with an emblem or logo that is circular or oval or has another simple geometric shape ("BMW," "Ford," "Chrysler," etc.) can mount the patch antenna directly underneath the emblem or logo. The antenna is then provided with a covering made of a material such as MYLAR with the emblem or logo on it. The covering is thus invisible or transparent to the antenna so the antenna can see the sky.

The GPS receiver can also be concealed in accordance with the invention. It can be located in the truck or the engine compartment of the vehicle, under a seat, in a glove box, or under the dashboard, as described in more detail below. Other locations will readily suggest themselves to those skilled in the art.

The concealment of both antenna and receiver is especially effective if different locations are chosen for different vehicles in a run of similar vehicles. Semi-customization of mass-produced products is well within the capabilities of modern technology. For example, in the mass production of motor vehicles, it is already customary to make minor and even not so minor variations of a run of vehicles on the same assembly line. One vehicle, for example, may have a standard audio system and the next an upgraded audio system; one vehicle may have standard wheels and the next upgraded wheels; one vehicle may have one upholstery and the next a different upholstery; and of course the details of color and trim may vary from one vehicle to the next. It is even possible in some advanced auto assembly plants to make different models in the same assembly line.

As part of the same manufacturing process, in accordance with the invention, a mobile communications system is concealed on or in each of a large number of similar vehicles by mounting a transmitter or receiver and an antenna electrically connected to the transmitter or receiver on or in the vehicles at locations relative to the vehicles that differ from one to another of the vehicles. The term "similar vehicles" is not limited to vehicles of the same model but is intended to encompass different models. One such vehicle may have the GPS receiver in the trunk, the next in the engine compartment, the next under a seat, the next in the glove box, and the next under the dash. Other locations will readily occur to those skilled in the art. The antenna locations are similarly varied. In the same way, the location of the cellular telephone antenna and transceiver are varied from one vehicle to another.

The invention facilitates the tracking and recovery of a stolen vehicle. A thief who steals the vehicle does not know where to look to find the antenna or the GPS receiver. If the antenna is concealed in the roof, hood, rear deck, trunk lid, etc., as described above, it may be totally hidden and virtually impossible to find. If it is camouflaged or disguised, it may still be quite time-consuming to find and disable it. If the vehicle is taken to a chop shop, signals transmitted by the communications system may lead the police to the chop shop, thereby jeopardizing the entire criminal operation. Widespread adoption of the invention can be expected to dampen the enthusiasm of professional thieves for vehicle theft.

It is within, the scope of the invention to activate the mobile communications system, including the GPS unit, anytime the engine is started, or anytime a vehicle alarm is set off, or anytime the engine is started in an abnormal manner, e.g., by bypassing the key control of the ignition system. Methods of accomplishing these tasks are well within the competence of those skilled in the art and need not be described herein. For example, some vehicles in some countries are required by law to have electrical circuits configured so that running lights are turned on automatically whenever the vehicle engine is turned on.

Figure 8:
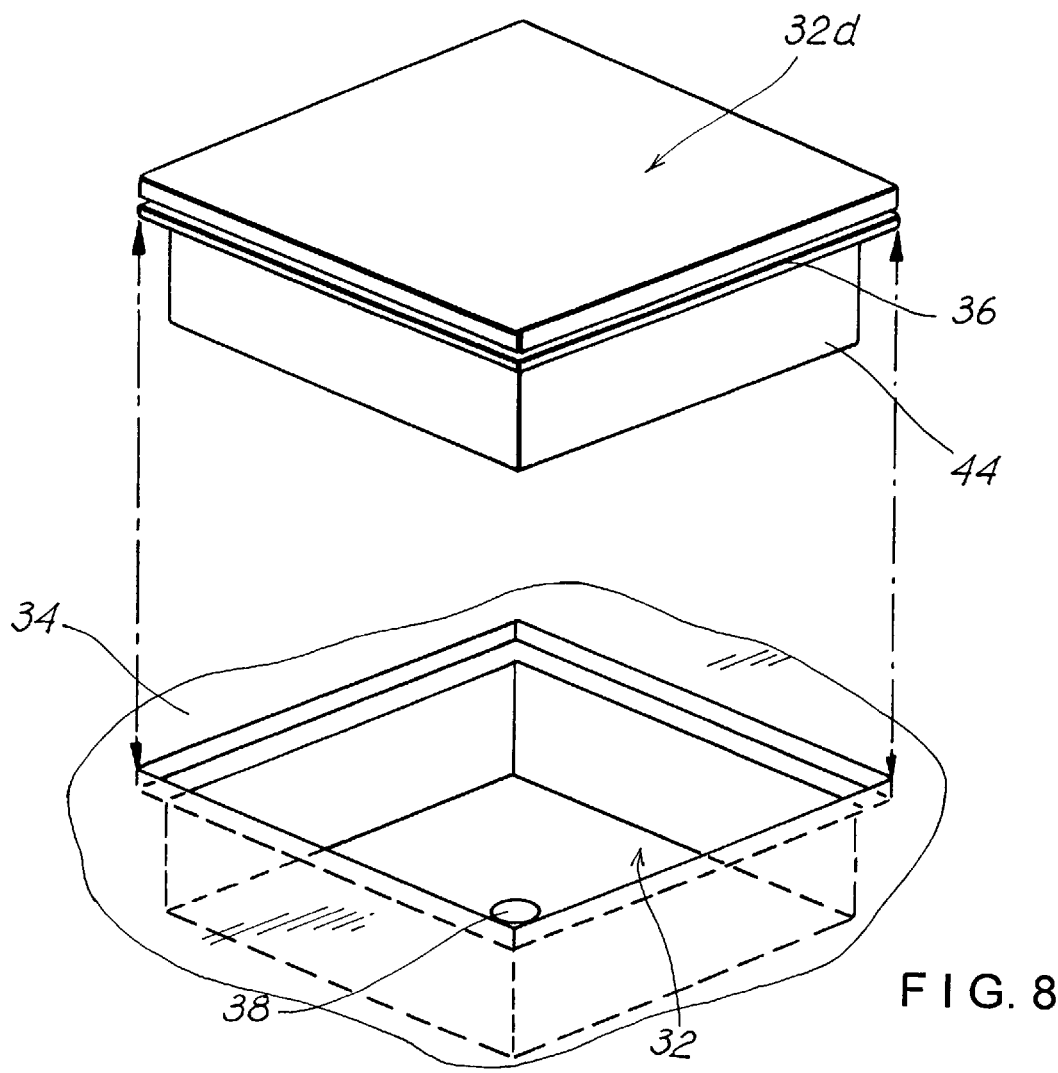
FIG. 8 is an exploded perspective view showing a preferred mounting of a patch antenna in a metal surface.

FIG. 8 shows one way of mounting a patch antenna. In this case, a well 32 is formed in the surface 34 of the metal (or plastic) forming the hood, roof, or trunk lid, etc. A patch antenna 32d composite structure, which can be formed with an integrated preamplifier 44 (FIG. 9), is mounted in the well and sealed in by or weather strip 36. A hole 38 is formed in the bottom of the well 32 for passage of a cable 46 (FIGS. 9 and 10) connected to the antenna structure 32d. The surface 34 of course faces upward so that the antenna structure 32d when mounted in the well 32 will be able to receive signals from navigation satellites.

Figure 9:
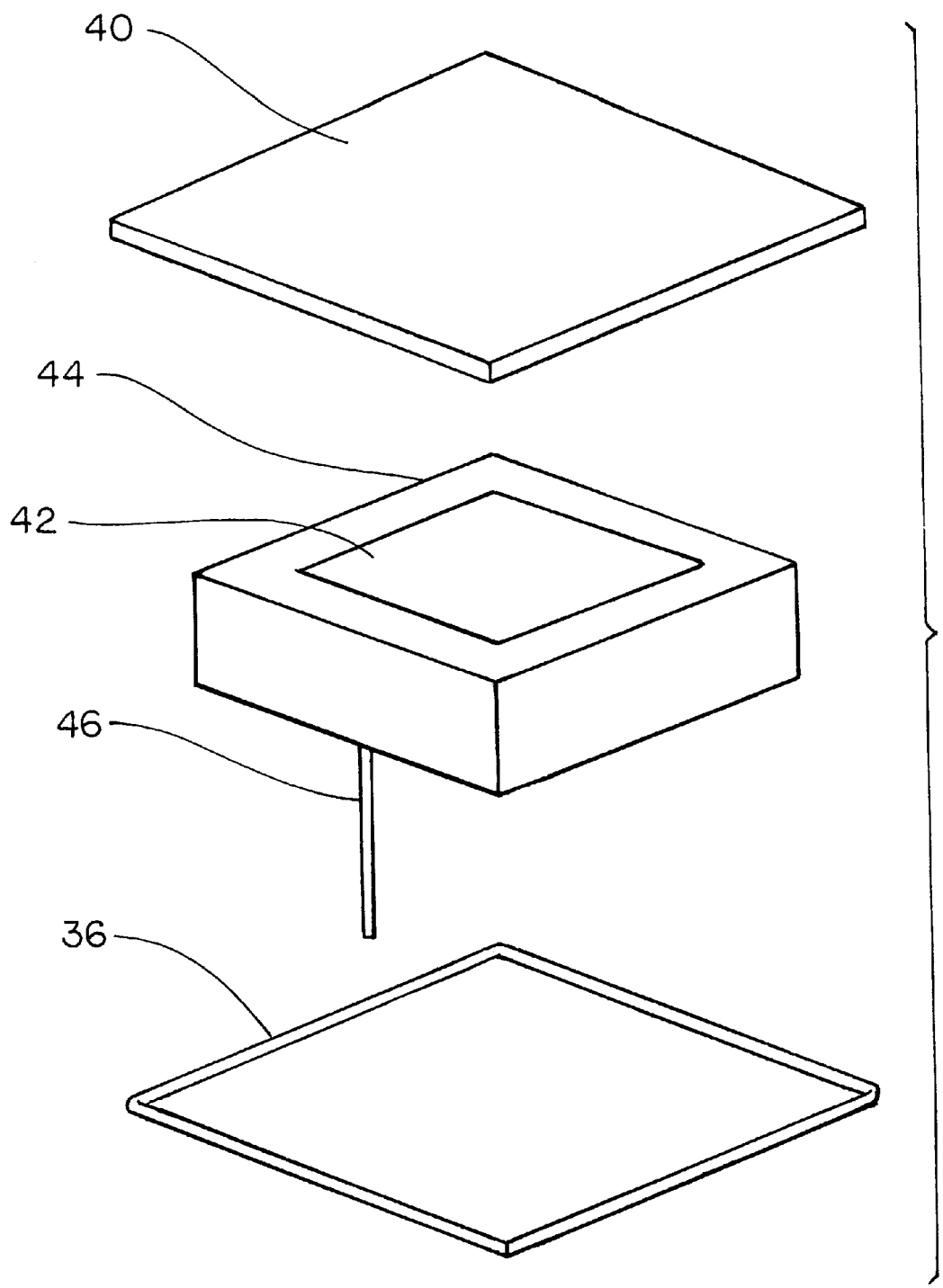
FIG. 9 is an exploded perspective view showing some additional details of the structure of FIG. 8.

FIG. 9 shows a MYLAR cover 40 covering the patch 42 and the integrated preamplifier 44. The latter functions also as an electrically insulating antenna mount. The cable 46 is electrically connected to the patch 42. An O-ring 36 surrounds the antenna mount 44 and provides weather protection. The MYLAR cover 40 is essentially transparent to the signal of interest: i.e., the MYLAR cover 40 does not greatly attenuate or distort the signal. The cover 40 is painted to match the surface 34. Thus the patch 42 is hidden by a cover which is visually indistinguishable from the rest of the surface 34 but can nevertheless transmit or receive the signals of interest.

Figure 10:
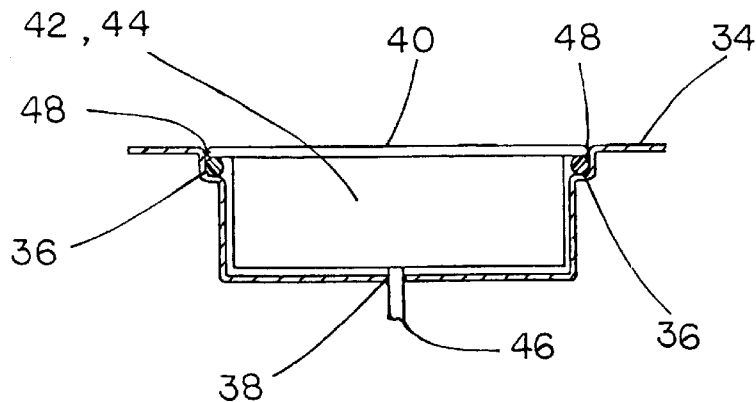
FIG. 10 is a sectional view showing further details of the structure of FIG. 8.

FIG. 10 is a vertical sectional view through the structure and shows the passage of the cable 46 through the hole 38. An annulus 48 formed of glue surrounds the patch antenna/preamplifier structure 42, 44 and forms a seal with the surface 44 and cover 40 above the O-ring 36, thereby enhancing weather protection.

Figure 11:
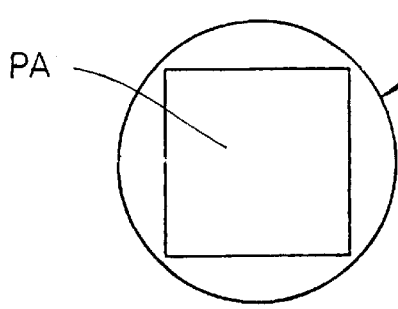
FIGS. 11 and 12 are respectively front and side views of an embodiment of a patch antenna and mounting structure therefor.
Figure 12:
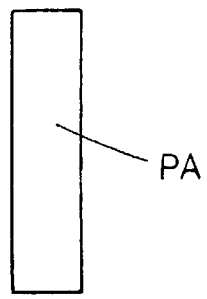
Figure 13:
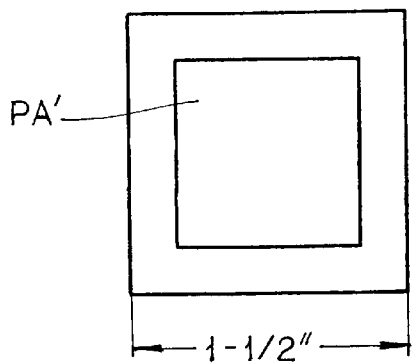
FIGS. 13 and 14 are respectively front and side views of another embodiment of a patch antenna and mounting structure therefor.
Figure 14:
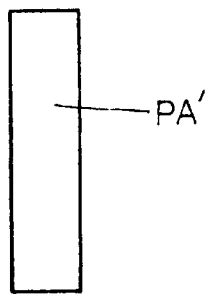

FIGS. 11 and 12 show a patch antenna PA in a cylindrical mount having naming a diameter of about 1.5 inches (3 or 4 centimeters) and a thickness of about 0.375 inches (about 1 centimeter). FIGS. 13 and 14 show a patch antenna PA' in a square mount having a front cross section of 1.5 inches× 1.5 inches (3 or 4 centimeters square) and a thickness of 0.375 inches (about 1 centimeter).

In accordance with the invention, the mount for the patch antenna may be either circular or square in cross section. It is therefore illustrated both ways in the several figures of the drawing. Of course, either shape may be employed in any of the instances illustrated.

Figure 15:
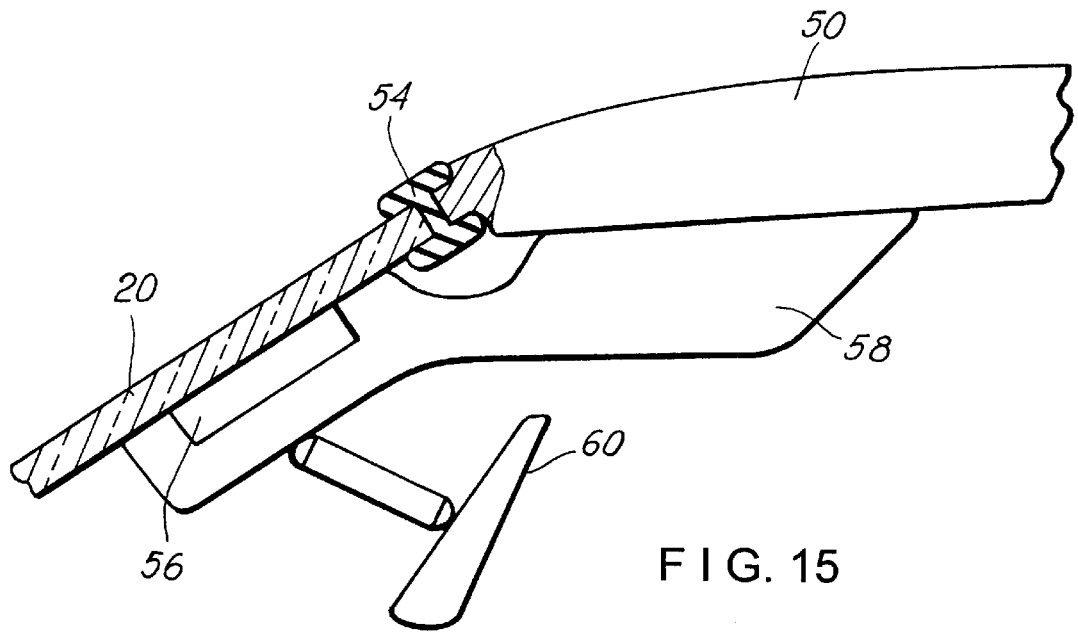
FIG. 15 is a fragmentary elevational view, partly in section, showing a preferred embodiment of a rear-view mirror assembly including a patch antenna and processor.

FIG. 15 shows the roof and framing 50 of a vehicle, weather stripping (seals) 54 on the vehicle, the vehicle windshield 20, a patch antenna 56 attached to the windshield, a processor and housing 58, and a rear-view mirror 60. By mounting the antenna, rear-view mirror, and processor electronics in one housing, the security system can be camouflaged or disguised as a map light, thus reducing the risk of vandalism by thieves. The all-in-one housing also reduces the number of unsightly and costly wires running from the antenna to the processor. The housing also allows the unit to fit nicely in convertible vehicles.

Figure 16:
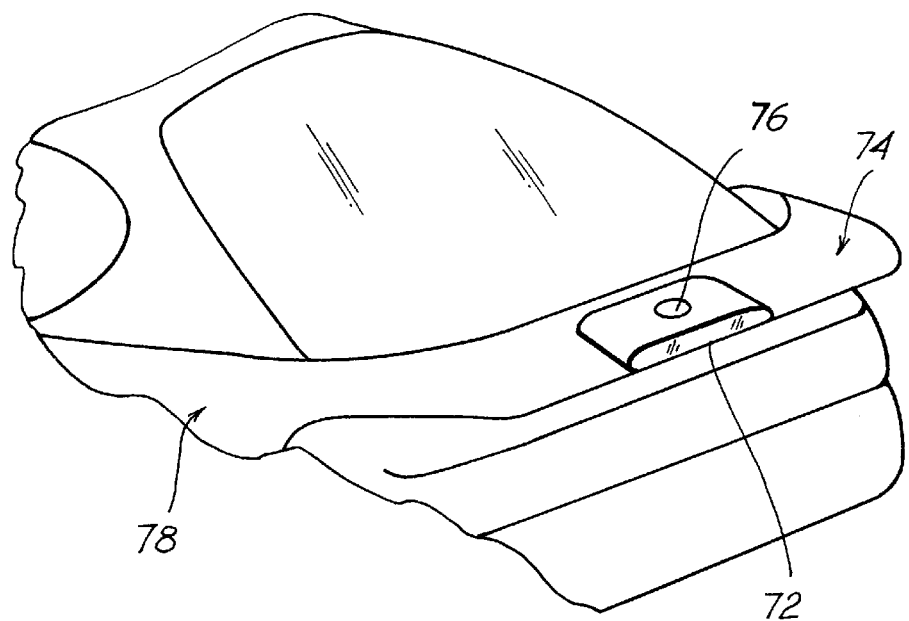
FIG. 16 is a fragmentary perspective view showing the mounting of a patch antenna on a third brake light located on the spoiler of a performance vehicle.

FIG. 16 shows a third brake light 72 located on the spoiler 74 of a performance vehicle 78. The spoiler 74 is mounted at the rear of the vehicle above the tail lights and bumper, and the third brake light 72 is incorporated in the spoiler 74. The patch antenna 26 is integrally incorporated in the housing for the third brake light 72.

Figure 17:
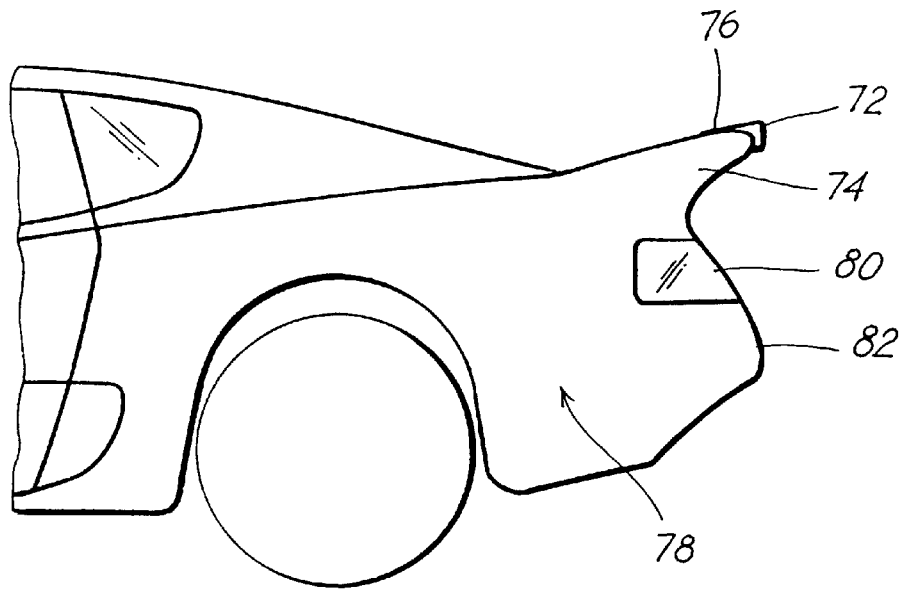
FIG. 17 is a fragmentary elevational view showing the placement of the patch antenna in relation to other parts of the vehicle of FIG. 16.

FIG. 17 shows from another perspective the structure of FIG. 16 in relation to the performance vehicle 78, including the rear spoiler 74, the standard tail lights 80 and the rear bumper 82.

Figure 18:
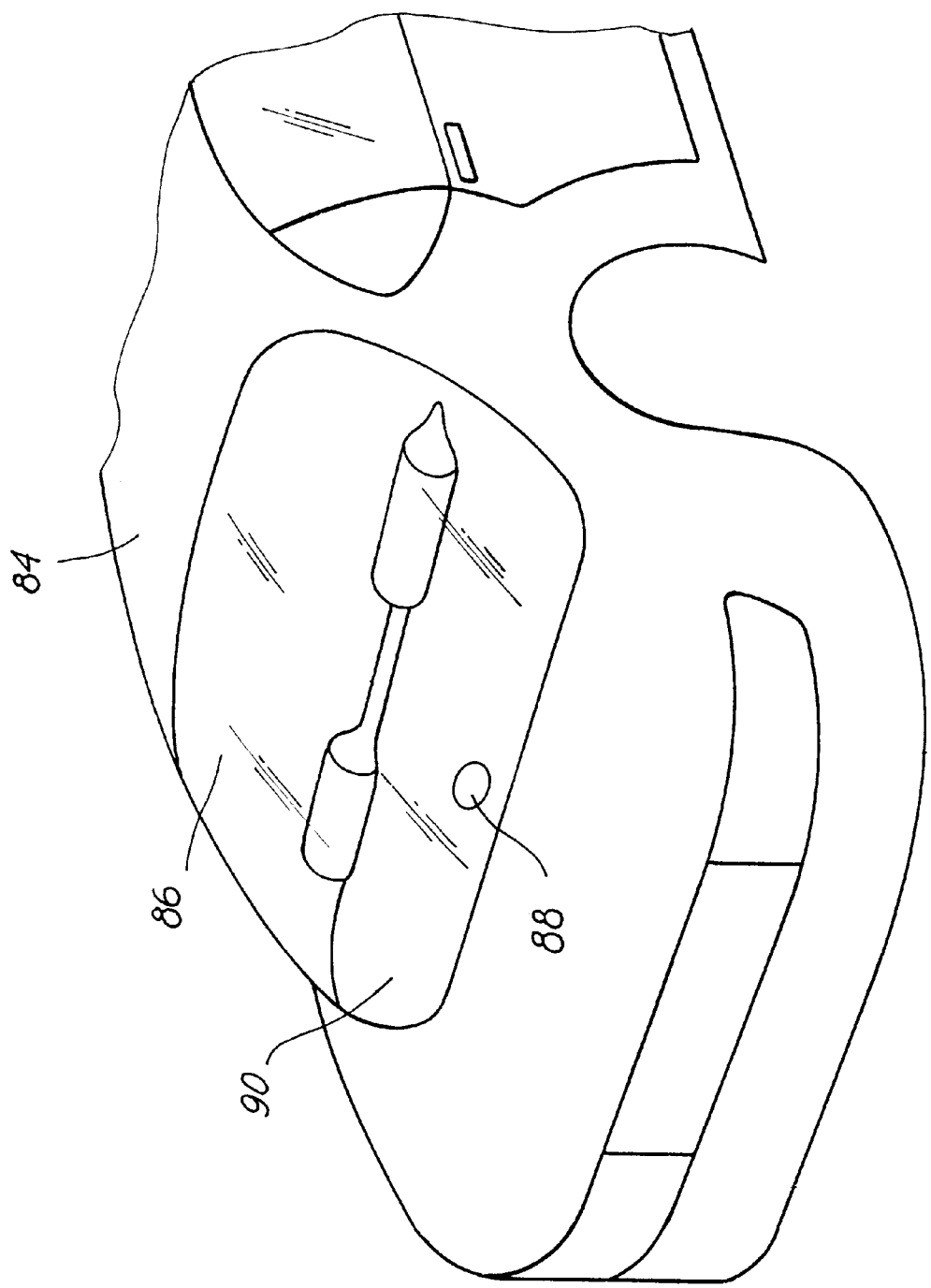
FIG. 18 is a perspective view showing an alternative mounting of a patch antenna in the rear deck of a vehicle.

FIG. 18 shows a vehicle 84, its rear window 86, and a patch antenna 88 mounted within the rear deck 90 of the vehicle, where it can be hidden by a fabric cover that extends over the entire rear deck. The patch antenna 88 and its covering are inside the passenger cabin, where they are well protected from the weather.

Figure 19:
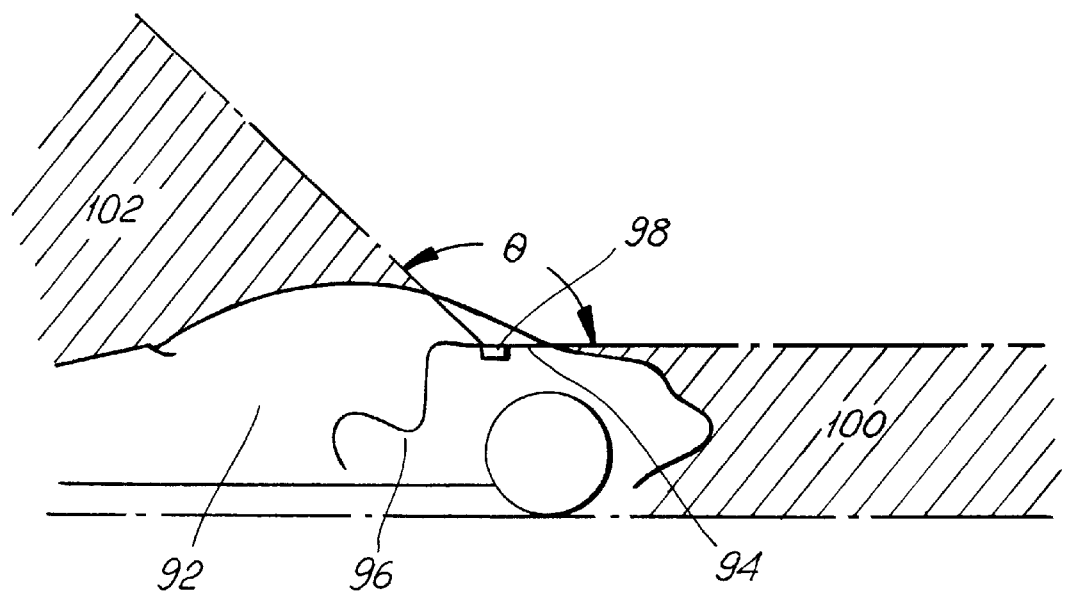
FIG. 19 is a diagram illustrating with respect to a particular mounting of a patch antenna the portion of sky that can be seen and the portion that is in shadow relative to the patch antenna.

FIG. 19 shows a vehicle 92, its rear deck 94 behind the rear seat 96, and a patch antenna 98 mounted in the rear deck 94. FIG. 19 also shows the shadows 100, 102 created by the structure of the vehicle 92, which in the main is metallic and opaque to the signals of interest. The patch antenna 98 can receive signals within the angle e but cannot receive signals from a transmitter within the shadows 100, 102. This is not a major problem, however, since it can be readily addressed as described below.

FIG. 20 discloses bumper-mounted front and rear antennas 112, 114. Since the front and rear antenna positions are known by the processor, the processor can determine the position of the vehicle so long as it receives a GPS signal. With the front and rear antennas working in tandem, the entire sky can be covered. As FIG. 20 shows, the angles $\Theta_1$ and $\Theta_2$ respectively at the front and rear of the vehicle cast a shadow 118 whose sides intersect at an apex 121 near the ground. Beyond the apex, the entire sky is visible by one antenna or the other, so a fix can always be obtained, given the now-standard liberal deployment of GPS satellites.

FIG. 21 shows multiple locations for an antenna in accordance with the invention. From the front to the rear of the vehicle 121, the locations are: front bumper 122, hood ornament 124, hood 126, rear-view mirror 128, roof 130, rear deck (or third brake light) 132, spoiler 134, and rear bumper 136.

Similarly, FIG. 22 shows possible transmitter/receiver locations. From front to back of the vehicle 138, they are: engine compartment 140, glove box 142, on the roof 144 (inside the cabin disguised as a map light), under the front seat 146, and on the underside of the trunk lid 148. Other locations will readily suggest themselves to those skilled in the art. In principle, even a location such as a wheel well can be used, especially in the case of future models of a receiver that may be smaller and more rugged than current models. Moreover, what is sometimes referred to herein as a single location may represent a multiplicity of locations. For example, within the roof of a vehicle there is the possibility of mounting a patch antenna in scores of different locations. In order to find it, it might be necessary virtually to destroy the roof of the vehicle. This is a significant deterrent to a thief, who must usually act quickly in order to avoid detection, especially if the vehicle has or is suspected to have a GPS tracking unit.

Figure 23:
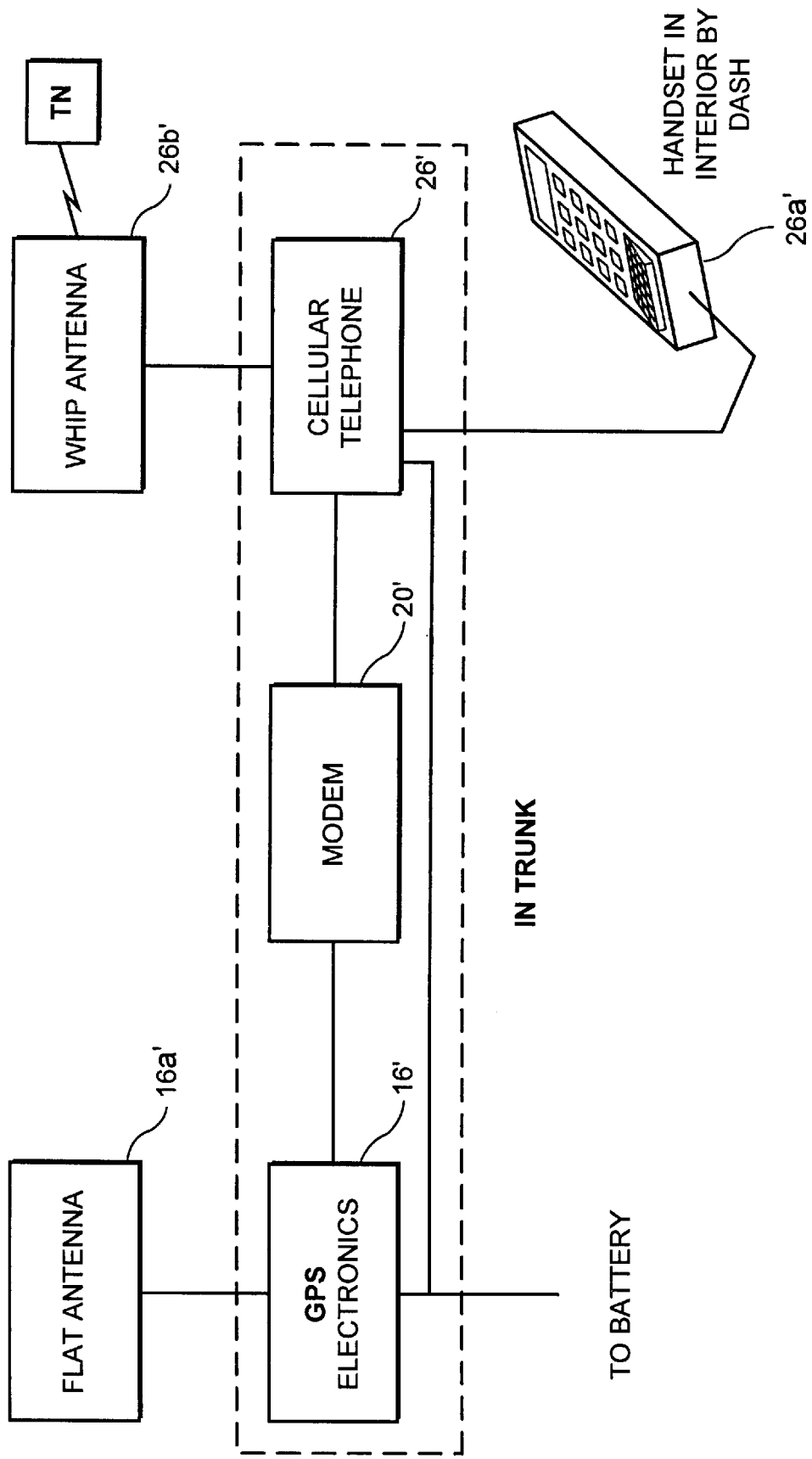
FIG. 23 is a block diagram of the components of the system in the vehicle.

As shown in the block diagram of FIG. 23, the GPS receiver 16', modem 20' and cellular telephone 26' may be integrated and located in a vehicle trunk with suitable connections to the vehicle battery, with the telephone handset 26a' located in the passenger compartment of the vehicle. The GPS antenna 16a' may be a flat antenna. The telephone antenna 26b' which is connected by wireless to a telephone network TN, may be a whip antenna located on the trunk lid or may be flat and concealed as described below.

Figure 24:
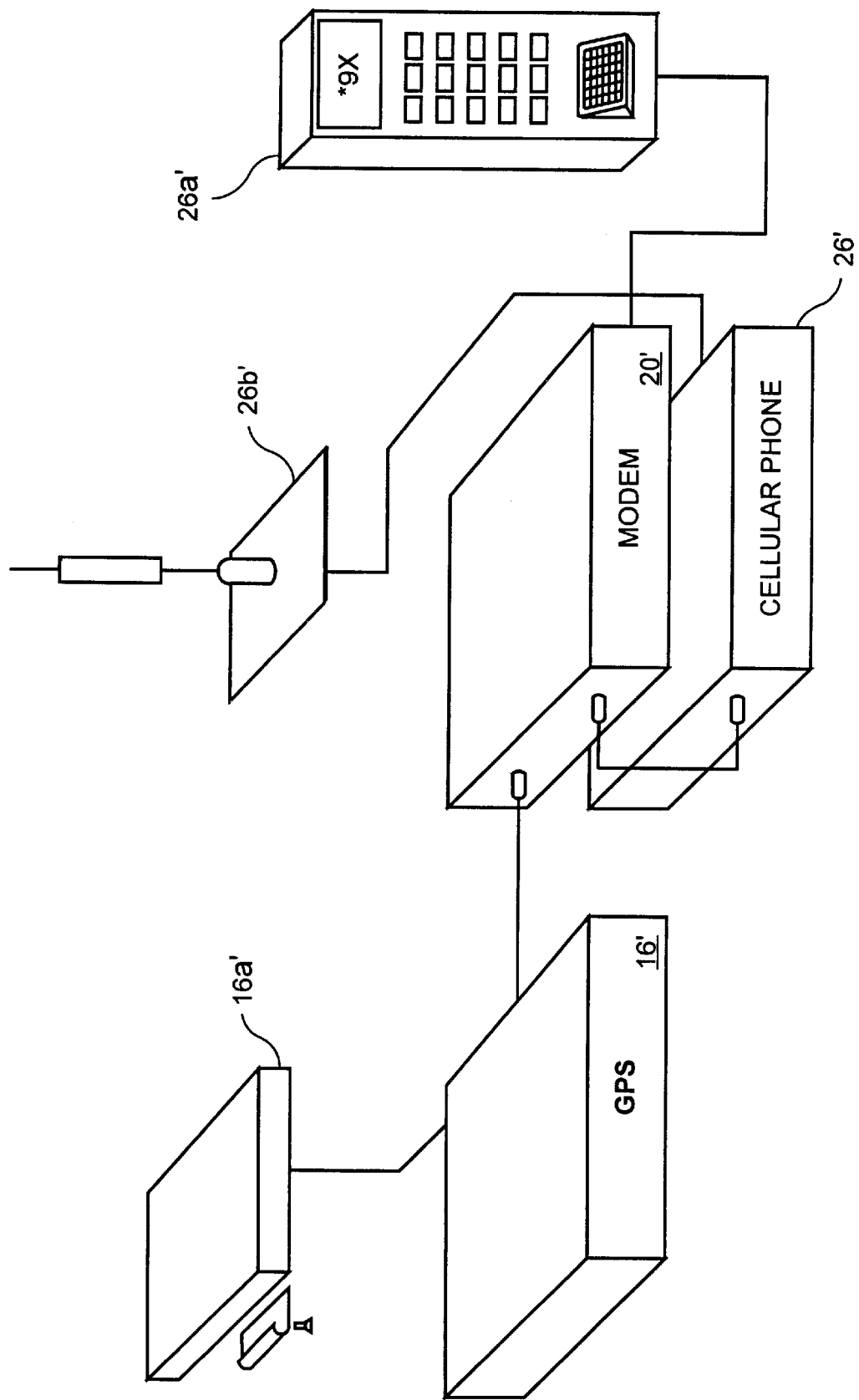
FIG. 24 is an alternative block diagram of the components of the in-vehicle equipment.
Figure 25:
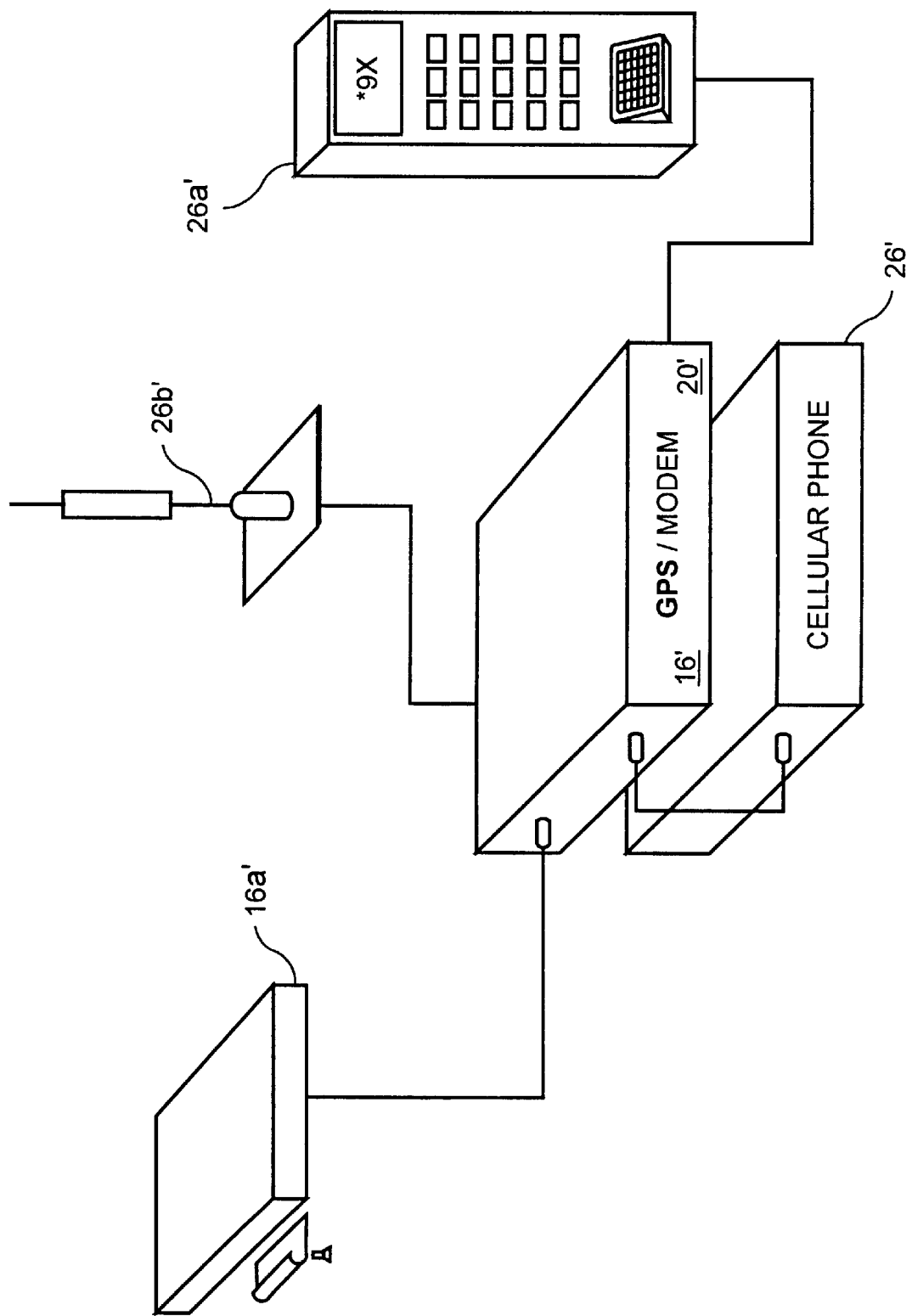
FIG. 25 is a block diagram of a more integrated version of the in-vehicle equipment.
Figure 26:
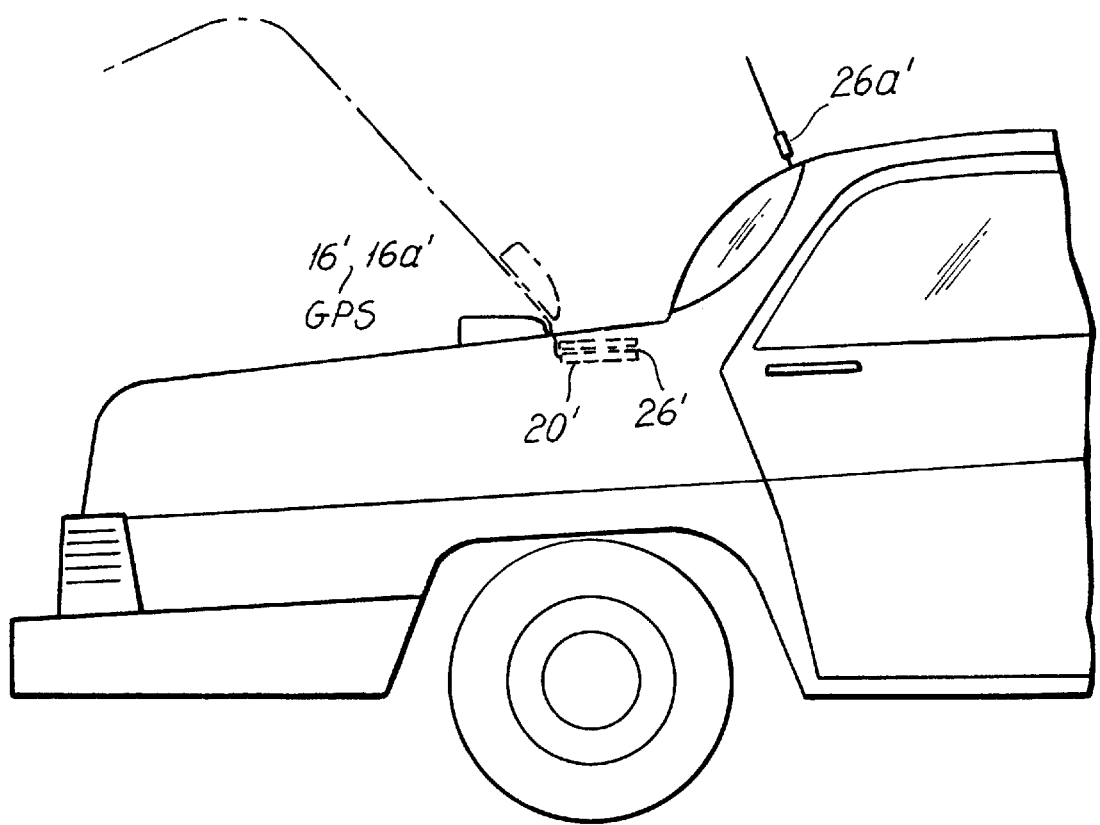
FIG. 26 shows an arrangement for locating the components in the vehicle, particularly an integrated GPS antenna/receiver.

As shown in FIG. 24, the basic components for a remote mobile unit or vehicle are a cellular phone 26' with handset 26a', which may include a "swipe" card reader for rental vehicles, a data modem 20', and a GPS receiver 16'. The cellular telephone may have its own antenna 26b' and the GPS receiver 16' may have its own antenna 16a'. The GPS receiver 16' and modem 20' (FIG. 24) may be packaged as a unit in a single module as shown in FIG. 25. The various modules of FIGS. 24 and 25 may be arranged and located a variety of different ways. FIG. 26 shows an arrangement similar to that of FIG. 23, except that the phone antenna 26a' is on the back of the roof, and the GPS receiver and antenna are integrated into a single module as a "smart antenna," similar in appearance to a third brake light on modern cars.

While the disclosure above relates mainly to the concealment of a patch antenna, other types of GPS antennas can be concealed by applying the principles of the present invention, and other communications antennas, such as those employed for cellular telephone communications, can also be concealed. For example, an antenna for cellular telephone communications can be mounted in a well, groove or trough formed in the exterior body paneling, covered with MYLAR, and painted to match the rest of the exterior or at least the portion of the exterior in the immediate vicinity of the antenna.

Figure 27:
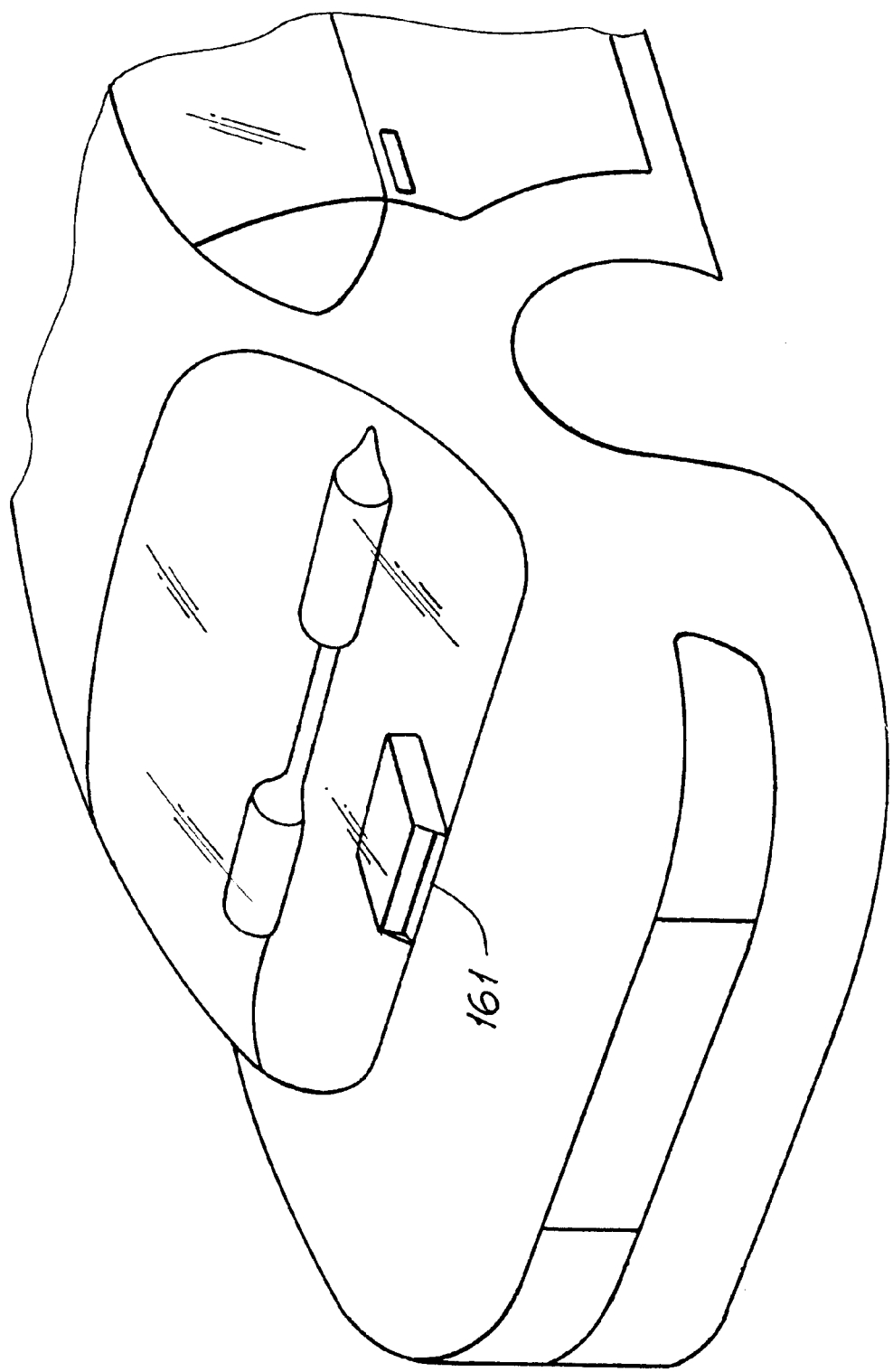
FIG. 27 is a perspective view from the right rear of a vehicle showing a unit incorporating both a GPS antenna and a cellular telephone antenna.
Figure 28A:
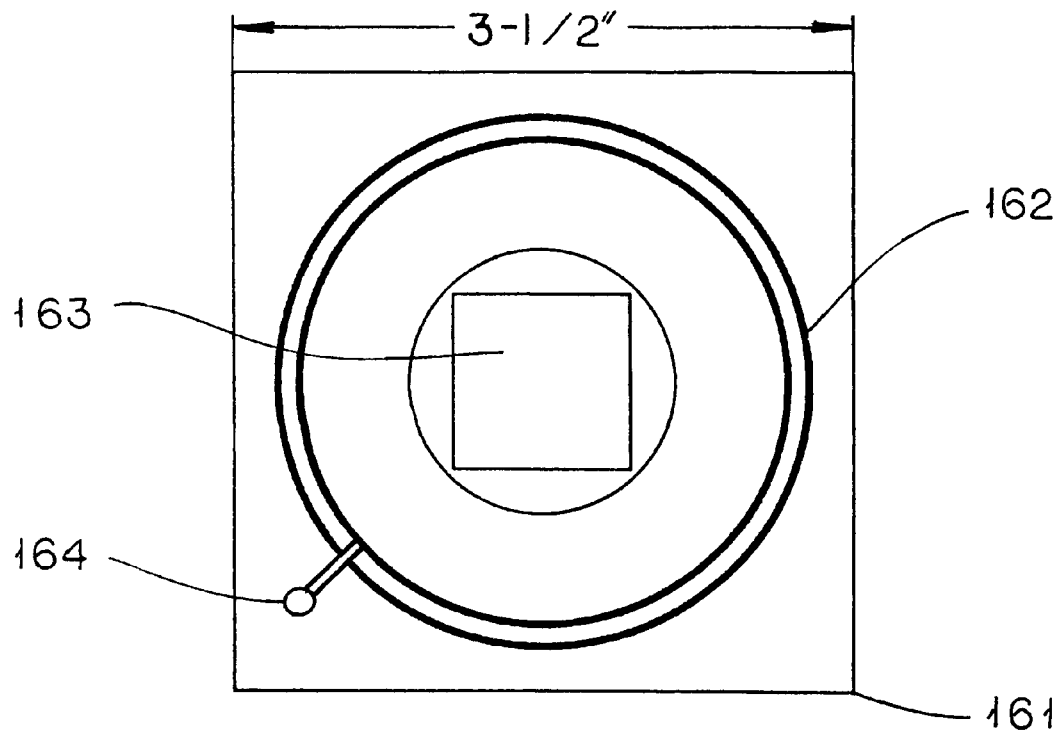
FIGS. 28a, 28b and 29 are respectively plan, elevational, and perspective views of the mounting unit and antennas of FIG. 27.
Figure 28B:
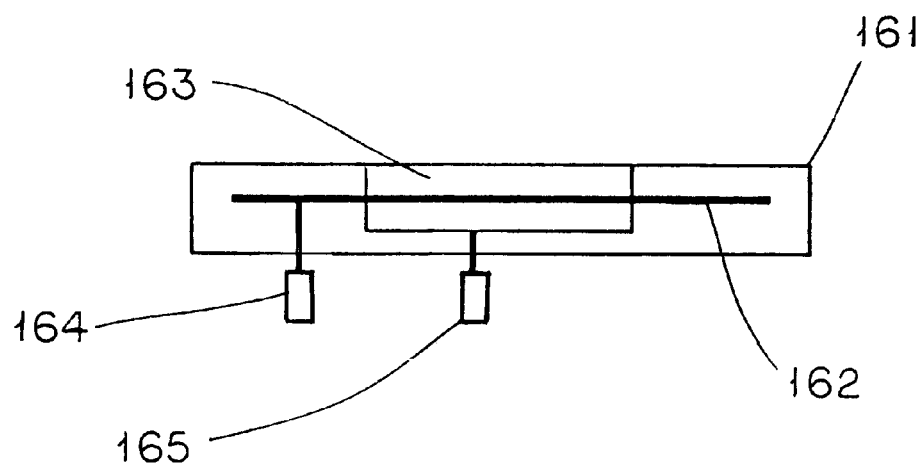
Figure 29:
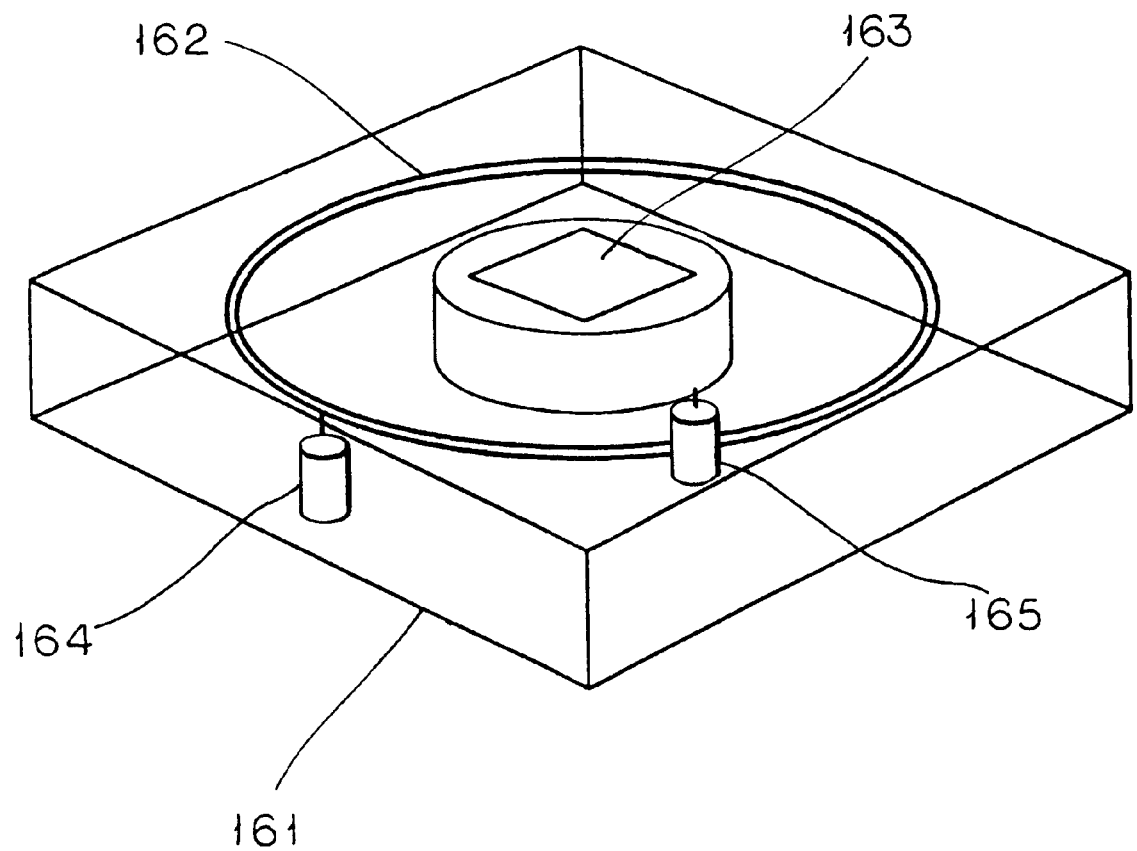

FIG. 27 shows a mounting unit 161 incorporating a GPS patch antenna and a cellular telephone antenna (and optionally a third brake light). FIGS. 28a, 28b and 29 show details of the mounting structure 161 and the components accommodated by it.

A patch antenna 163 and a cellular telephone antenna 162 are connected to electrical feed circuits 165 and 164, respectively, for GPS and cellular telephone signals. The former are of course signals received by the antenna 163 from GPS satellites and the latter are signals that are either transmitted or received by the antenna 162. The GPS and cellular telephone processing units are interconnected as illustrated in FIGS. 23–25. Thus it is possible to obtain a vehicle fix and transmit it to a remote location in response to a user command or automatically in case of vehicle theft, as described above.

The antenna 162 is flat and circular and easily concealed in the mount 161, which can be 3.5 inches square, as indicated in FIG. 28a (about 9 centermeters square). Thus a very small mount can accommodate both of the antennas. The techniques described above (MYLAR covering, etc.) can be applied to the structure of FIGS. 28a, 28b and 29 so that the structure is effectively concealed.

Thus there is provided a novel and highly effective mobile communications system for transmitting or receiving a broadcast signal and a method for mounting it on or in a vehicle. In accordance with the invention, a stolen vehicle is easily tracked, and the tracking apparatus incorporated in the vehicle is not easily detected or disabled by a thief.

Many modifications of the preferred embodiments of the invention disclosed above will readily occur to those skilled in the art: the method of concealment, and the location within the vehicle of the antenna and transmitter/receiver can be varied beyond the specific examples given above, as those skilled in the art will readily understand. Accordingly, the invention is to be construed as including all structure and methods that fall within the scope of the appended claims.

We claim:

1. Mobile communications system for receiving and transmitting signals of first and second kinds and designed for use in a vehicle, the system comprising:

a receiver;

a first antenna electrically connected to the receiver for receiving signals of the first kind;

a transceiver;

a second antenna electrically connected to the transceiver for receiving and transmitting signals of the second kind; and a mount for mounting the first and antennas together and concealing them on or in the vehicle;

wherein the signals of the first kind are navigation signals and the first antenna is a patch antenna for receiving the signals of the first kind;

the signals of the second kind are telephone signals and the second antenna forms a loop for transmitting and receiving the signals of the second kind; and the antenna mount mounts the patch antenna within the loop.

2. A system according to claim 1 wherein the antenna mount mounts the patch antenna and the loop antenna concentrically with each other.

* * * * *